United States Patent [19]

Kaufmann

[11] Patent Number: 4,630,672
[45] Date of Patent: Dec. 23, 1986

[54] ON LINE SCRUBBING SYSTEM FOR PLATE AND FRAME HEAT EXCHANGERS

[76] Inventor: Richard O. Kaufmann, 6050 El Camino del Cerro, Tucson, Ariz. 85705

[21] Appl. No.: 630,021

[22] Filed: Jul. 12, 1984

Related U.S. Application Data

[63] Continuation of Ser. No. 390,848, Jun. 22, 1982, abandoned, which is a continuation of Ser. No. 101,719, Dec. 10, 1979, abandoned, and a continuation of Ser. No. 873,252, Jan. 30, 1978, abandoned.

[51] Int. Cl.[4] .................................................. F28G 1/16
[52] U.S. Cl. ..................................... 165/95; 165/109.1; 165/908
[58] Field of Search ............. 165/95, 109 R, DIG. 12, 165/DIG. 11

[56] References Cited

U.S. PATENT DOCUMENTS

| | | | |
|---|---|---|---|
| 1,807,457 | 5/1931 | Weis | 165/95 |
| 2,302,513 | 11/1942 | Abraham, Jr. | 165/95 X |
| 2,576,843 | 11/1951 | Lockman | 165/95 |
| 2,717,319 | 9/1955 | Bundy | 165/109 R |
| 4,318,781 | 3/1982 | Iida | 165/DIG. 11 |
| 4,373,572 | 2/1983 | Kaufmann | 165/DIG. 12 |

*Primary Examiner*—William R. Cline
*Attorney, Agent, or Firm*—Cahill, Sutton & Thomas

[57] ABSTRACT

Air under pressure is injected into a contaminated fluid flowing into a plate and frame heat exchanger. The injected air turbulates the flow of the contaminated fluid within the plate and frame heat exchanger and also produces a scrubbing action. Both the turbulence and the scrubbing reduce the deposition of contaiminates upon the surface of the plate and frame heat exchanger.

1 Claim, 4 Drawing Figures

ON LINE SCRUBBING SYSTEM FOR PLATE AND FRAME HEAT EXCHANGERS

This application is a continuation of Ser. No. 390,848 filed June 22, 1982 (abandoned) which is a continuation of application Ser. No. 101,719 filed Dec. 10, 1979 (abandoned) and a continuation of Ser. No. 873,252 filed Jan. 30, 1978 (abandoned).

The present invention relates to scrubbers for heat exchangers and, more particularly, to air injection scrubbing means for use on line with plate and frame heat exchangers.

Tube and shell heat exchangers are commonly used in many industries to draw heat from waste fluids flowing therethrough. Generally, such waste fluids are not pure and may contain soluble and insoluble contaminates, suspended particulate matter and even solids of relatively substantial size. In due time, deposits build up upon the surfaces of the heat exchanger subjected to the waste fluid and such deposits reduce the rate of heat transfer. Accordingly, the tube and shell heat exchangers must be periodically cleaned to maintain an adequate flow rate and rate of heat transfer.

The cleaning process may be achieved by reversing the flow or it may require mechanical scrubbing, depending upon the nature of the deposits. Necessarily, during the cleaning process, the tube and shell heat exchanger must be taken off line and a standby heat exchanger must be used to allow continuity of operation of the facility.

The cleaning process is necessarily expensive both from the standpoint of the direct costs associated therewith and because of the costs necessary to maintain a standby heat exchanger of adequate capacity.

Because of their construction, plate and frame heat exchangers are generally far more simple to disassemble for cleaning purposes than tube and shell heat exchangers. Additionally, they generally require less floor space and volume than commensurate capacity tube and shell heat exchangers. However, plate and frame heat exchangers are more sensitive to clogging by contaminated fluids flowing therethrough than tube and shell heat exchangers. In industries such as commercial laundries, where chemical contaminants and suspended particulate matter are present in the waste water, plate and frame heat exchangers are generally less suitable than tube and shell heat exchangers because of their propensity for becoming clogged.

Other industries, such as the paper making industry, have extensive needs for heat exchangers to withdraw heat from fluids contaminated with fibrous pulp and chemical soluble and insoluble contaminants. By filtering the fluids prior to entry into plate and frame heat exchangers, the cleaning thereof can be deferred for a period of time but buildup of deposits, due to particulate and chemical contaminants, still renders periodic cleaning mandatory.

The following U.S. patents describe various heat transfer units which incorporate certain devices and methods for reducing the down time of heat exchangers for cleaning purposes: U.S. Pat. Nos. 1,723,906, 1,825,498, 3,194,308, 2,058,022, 3,400,754, 3,521,706, 3,978,917, 4,018,267, 4,025,362, and 4,026,352.

It is therefore a primary object of the present invention to provide a means for continually scrubbing the surfaces of a plate and frame heat exchanger subjected to a contaminated fluid.

Another object of the present invention is to provide a means for repetitively impacting the surfaces of a plate and frame heat exchanger, which surfaces are subjected to a contaminated fluid.

Yet another object of the present invention is to provide a heat recovery system incorporating a plate and frame heat exchanger for use in recovering heat from waste water having chemical and particulate matter contaminants.

Still another object of the present invention is to provide a scrubbing action to a contaminated fluid flowing through a heat exchanger.

A further object of the present invention is to provide a scrubbing action to a contaminated fluid flowing within a plate and frame heat exchanger by injecting air into and mixing the air with the inflowing fluid.

A yet further object of the present invention is to provide an air injection system for introducing air into contaminated waste water of commercial laundries flowing into a plate and frame heat exchanger.

A still further object of the present invention is to provide a more effective heat recovery system for commercial laundries, which system recovers heat and reduces sewer surcharges.

These and other objects of the present invention will become apparent to those skilled in the art as the description thereof proceeds.

The present invention may be described with greater specificity and clarity with reference to the following drawings, in which.

Commercial laundries have very special problems attendant the disposal of waste water. First, the waste water is contaminated with soap/detergent introduced as the medium for cleaning the laundered articles. Second, the articles to be cleaned often shred and the shreds are removed by the waste water. Third, the articles to be laundered may include solids or particulate matter which are carried away by the waste water. Fourth, the articles to be laundered may include various chemicals which are removed by the soap/detergent; these chemicals may or may not be soluble in the waste water. Fifth, the municipalities wherein commercial laundries are located, often impose a surcharge in the event contaminated water of more than a minimum degree of contamination is introduced into the sewer system.

To effect savings in fresh water heating costs, heat is generally drawn off from the waste water by means of a heat exchanger. The surfaces of such a heat exchanger must be maintained relatively clean in order to effect an adequate flow rate and heat transfer rate. Because the waste water is contaminated, both chemically and with particulate matter, efforts must be undertaken to prevent the contaminants from rapidly reducing the heat transfer capability of the heat exchanger and resulting in losses due to down time of the heat exchanger for cleaning purposes.

In commercial laundries, tube and shell heat exchangers are most often employed because such heat exchangers are relatively insensitive to clogging by particulate matter. However, such heat exchangers, to be sufficiently noncloggable, are relatively massive. The plate and frame heat exchangers are of substantially lesser volume and massiveness than that of tube and shell heat exchangers of the same capacity but the plate and frame heat exchangers are substantially more sensitive to clogging. In example, the interstices between adjacent plates may be $\frac{1}{8}''$ or less. Therefore, plate and frame heat exchangers have generally not been used in the past in facilities, such as commercial laundries, wherein the waste fluid is contaminated with chemical and/or particulate matter.

Figure 2:
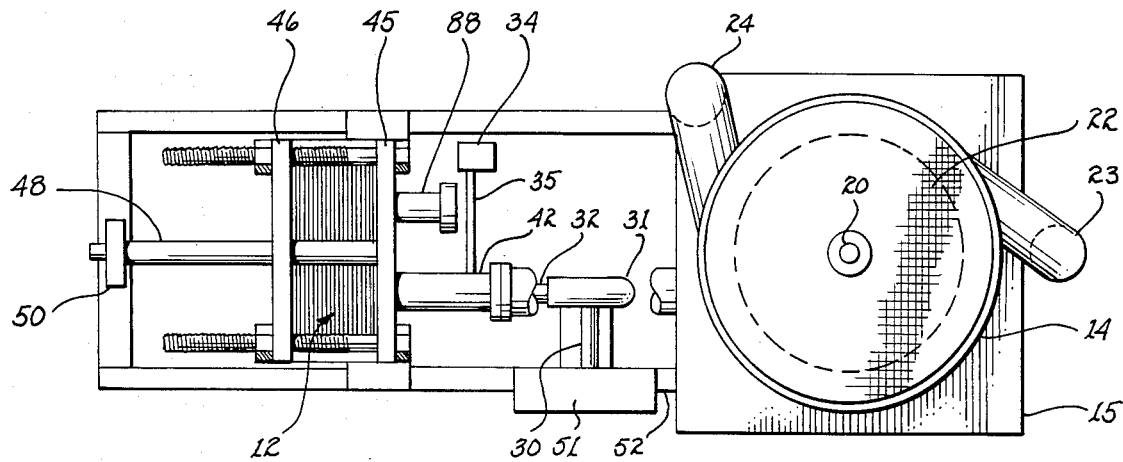
FIG. 2 is a top view of the system illustrated in FIG. 1.
Figure 1:
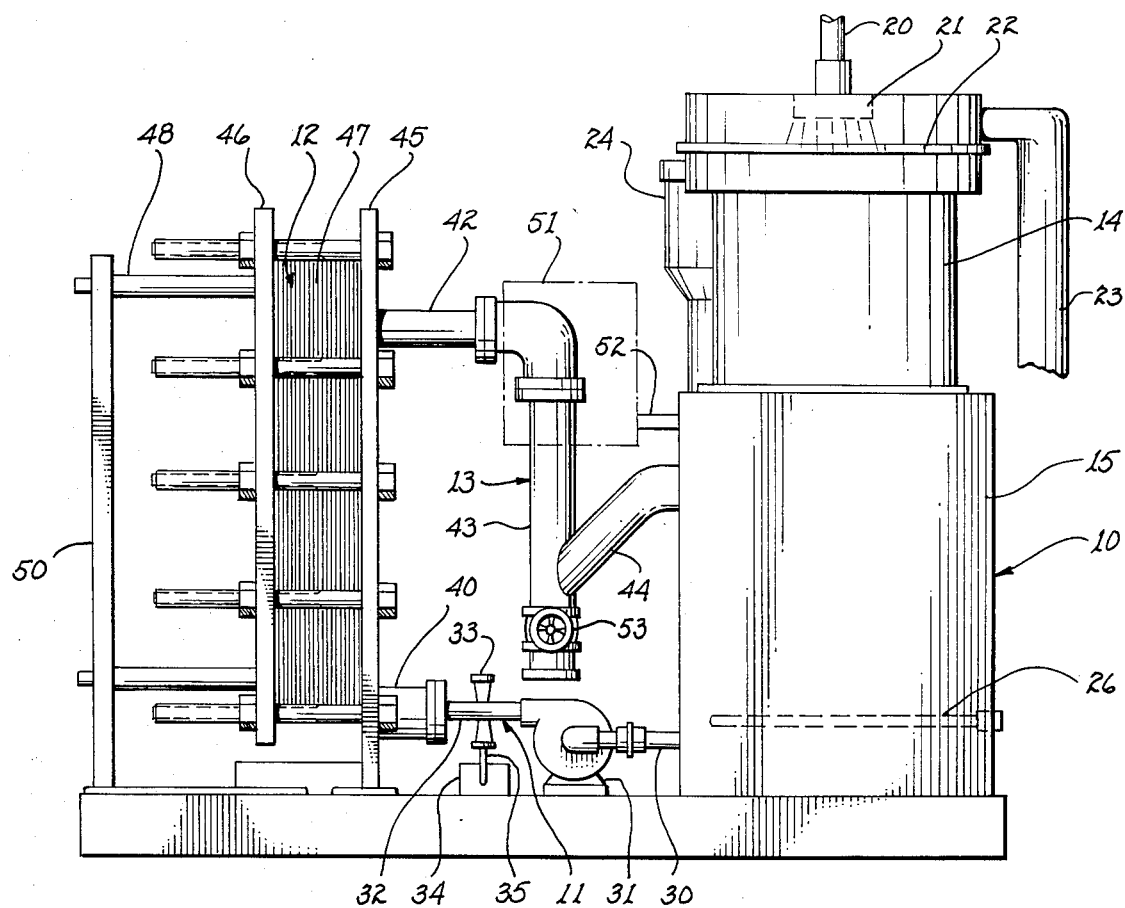
FIG. 1 is a side view of a heat recovery system useable in a commercial laundry.

Referring now to FIGS. 1 and 2, there is illustrated a heat recovery system useable in a commercial laundry and which system incorporates a plate and frame heat exchanger. The heat recovery system includes a waste water feed unit 10, an air injection unit 11, a heat exchanger unit 12 and a discharge unit 13.

The waste water feed unit includes a screening unit 14 mounted upon a feed tank 15. This screening unit is of a commercial type, such as Model K48-1-316, known as a 48" Vibroscreen manufactured by Kason Corp., Newark, N.J., or Model LS48C66, known as a Sweco Vibro-Energy Separator manufactured by Sweco, Inc., Los Angeles, Calif. In operation, screen 22 is vibrated vertically and laterally to screen particulate matter from a fluid while precluding clogging of the screen. For the present invention, when used in commercial laundries, a screen having a mesh size in the range of 0.003" to 0.009" is preferable.

Waste water is introduced to waste water feed unit 10 through conduit 20. The waste water flows through a distributor 21 which distributes the waste water upon screen 22. Particulate matter, not passing through screen 22, is discharged, by the vibrating action of the screen, into a receptacle or the like through conduit 23. The screened waste water flows from a chamber beneath the screen through a conduit 24 and into feed tank 15.

The feed tank may be insulated to maintain the heat embodied in the waste water. Also, a pipe 26, having a plurality of apertures disposed therein, may be mounted within feed tank 15 to discharge steam into the feed tank from a boiler during boiler blow down. Thereby, heat recovery can be effected from the steam released from the boiler.

The waste water is drawn from waste water feed unit 10 into air injection unit 11 through a conduit 30 connected to the input of a feed pump 31. The output of pump 31 flows under pressure through conduit 32 into heat exchanger unit 12. An air injection nozzle unit 33, which may be of conventional design or simply one or more apertures in conduit 32, is in fluid communication with the interior of conduit 32. The air injection nozzle unit receives a source of air under pressure from an air compressor 34, or the like, via a pipe 35. Necessarily, the air to be injected must be at a greater pressure than the ambient pressure within conduit 32. It may also be noted that operation of pump 31 precludes upstream flow of the air injected through the air injection nozzle unit.

A mixture of waste water and air enters a plate and frame heat exchanger 41 of heat exchanger unit 12 through inlet 40. The plate and frame heat exchanger may be of the type manufactured by the American Heat Reclaiming Corporation, embodiments of which are described and illustrated in U.S. Pat. Nos. 2,787,446, 2,791,402 and 2,865,613. The cooled waste water flows from the heat exchanger unit through outlet 42 into discharge unit 13. The discharge unit includes a pipe 43 for discharging the waste water into a sewer or the like.

The discharge unit may include a pipe 44 interconnecting pipe 43 with feed tank 25 and a valve 53 downstream of pipe 44. Pipe 44 can serve two functions. When valve 53 is open it serves as an overflow pipe for discharging excess water from the feed tank directly into the discharge unit. If valve 53 is closed, recirculation of water or a cleaning solution can be effected, the details of which will be described below.

A control panel 51 (shown in phantom lines in FIG. 1) may be attached to feed tank 15 by brace 52. This control panel may include the switches and gauges necessary to control and regulate the heat recovery system.

The plate and frame heat exchanger includes a fixed position end cover 45 and a movable end cover 46 which together sandwich a plurality of plates 47 therebetween. The covers and plates are supported upon carrying bars 48 and 49 extending intermediate cover 45 and a support member 50. The surfaces of plates 47 are ribbed and channeled in such a manner that the flow of the fluid to be heated and the heating fluid are interleaved to maximize heat transfer therebetween. Depending upon the surface configuration of adjacent plates defining a passageway, the passageway, having a width and length commensurate with the width and length of the plates may have a breadth of $\frac{1}{8}''$ or less at certain points or interstices of the plate convolutions. Generally, the inlet and outlet for the fluid to be heated are located at the top and bottom, respectively, along one side of cover 45 and the inlet and outlet of the heating fluid are located at the bottom and top, respectively, along the other side of the cover.

Because the cross-section of the passages intermediate adjacent plates 47 is relatively small, fouling will readily occur due to particulate matter or chemical deposits (films) building up on the plate surfaces. To reduce clogging, the passage defined by adjacent plates 47 is purposely configured to effect turbulent flow of the fluids. However, such turbulent flow is generally inadequate to prevent clogging or film buildup when the waste water from commercial laundries is passed through a plate and frame heat exchanger.

Because of the small floor space required for plate and frame heat exchangers in comparison to other heat exchangers for comparable flow rates, their use is preferred, if at all possible. To make plate and frame heat exchangers useable in commercial laundries where, generally, floor space is at a premium and very expensive, the problems of rapid clogging due to the contaminated waste water must be overcome. The air injection unit described and illustrated herein makes it possible to use, on an economical basis, plate and frame heat exchangers in commercial laundries. It is also anticipated that the use of plate and frame heat exchangers can now be made possible in other industries having similarly contaminated waste water from which heat is to be withdrawn.

By injecting air under pressure into the waste water flowing through inlet 40 of the heat transfer unit, several benefits are achieved.

First, the initial injection of air into the lower pressure stream of waste water results in expansion of the air which in turn increases the velocity of flow. The increased flow velocity raises the Reynolds Number attendant the flow through the passages within the heat exchanger. Since turbulence is, within certain limits, proportionally increased with an increase in the Reynolds Number, the additional turbulence produces more cleaning action of plate surfaces.

Figure 3:
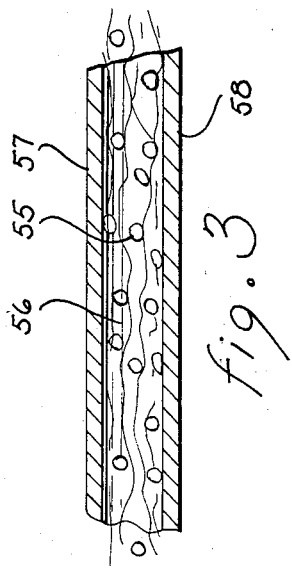
FIG. 3 is a representative cross-section of the air permeated waste water flowing through a plate and frame heat exchanger.

Secondly, and more importantly, the bubbles of air 55 (see FIG. 3) permeated throughout the waste water 56 flowing intermediate plates 57 and 58 of the heat exchanger, result in a continual variation of the density of the medium flowing across any given point of the plate surfaces. Such density variations produce successive impacts upon the surface. These successive impacts tend to preclude deposition of particulate matter upon the plate surfaces and tend to dislodge any film, scale or deposit buildup upon the plate surfaces by the water transported chemicals or due to chemical interaction between the plate surfaces and the chemicals contained in or conveyed by the waste water.

Accordingly, the air bubbles provide a scrubbing action to substantially reduce the rate of buildup of deposits upon the plate surfaces. Such reduction in buildup permits a more effective heat transfer for a longer period of time. Thereby, the interval between down times for cleaning purposes of the heat transfer unit is substantially increased by the air injection unit.

To illustrate the effectiveness of the air injection unit, the results of several experiments will be reviewed.

In one commercial laundry installation employing a plate and frame heat exchanger and an air injection unit, the air injection unit was deactivated. Lengths of human hair, passing through the screening unit, became jammed at various interstices between plates of the heat exchanger. Lint, and the like, collected upon the jammed lengths of hair and, collectively, partially clogged the passages in the heat exchanger. After activation of the air injection unit, the lint was scrubbed off the jammed hair and flow became, once again, essentially unimpeded (the flow impediment presented by the jammed hair alone was essentially incidental and inconsequential).

Oils of various types, including body oils, are impregnated in many of the articles laundered in a commercial laundry. These oils tend to coagulate upon the surfaces of the plates in the plate and frame heat exchanger due to the cold surfaces of the plates (brought about by the temperature of the water to be heated). Shortly, a film is developed on the surfaces, which film restricts the flow and reduces the heat transfer rate. During a period of non-use of the laundry facility (nighttime) valve 53 was closed and a cleaning solution of water, grease solvent and detergent was deposited in feed tank 15. On actuation of feed pump 31 and air injection nozzle unit 33, the air bubble impregnated cleaning solution recirculated from the plate and frame heat exchanger through pipe 44 to the feed tank and through inlet 40 back to the plate and frame heat exchanger. On later inspection of the surfaces of the plates, it was found that the film had been completely removed and the plates were as clean as when new. Previous experiments of this type without actuation of air injection unit 11 failed to produce such results. Accordingly, the air injection unit, when operated in conjunction with a cleaning solution, can and will scrub a heat exchanger during normal non-use of the laundry facilities and thereby eliminate the need for down time of the plate and frame heat exchanger to take it off line for cleaning purposes.

Figure 4:
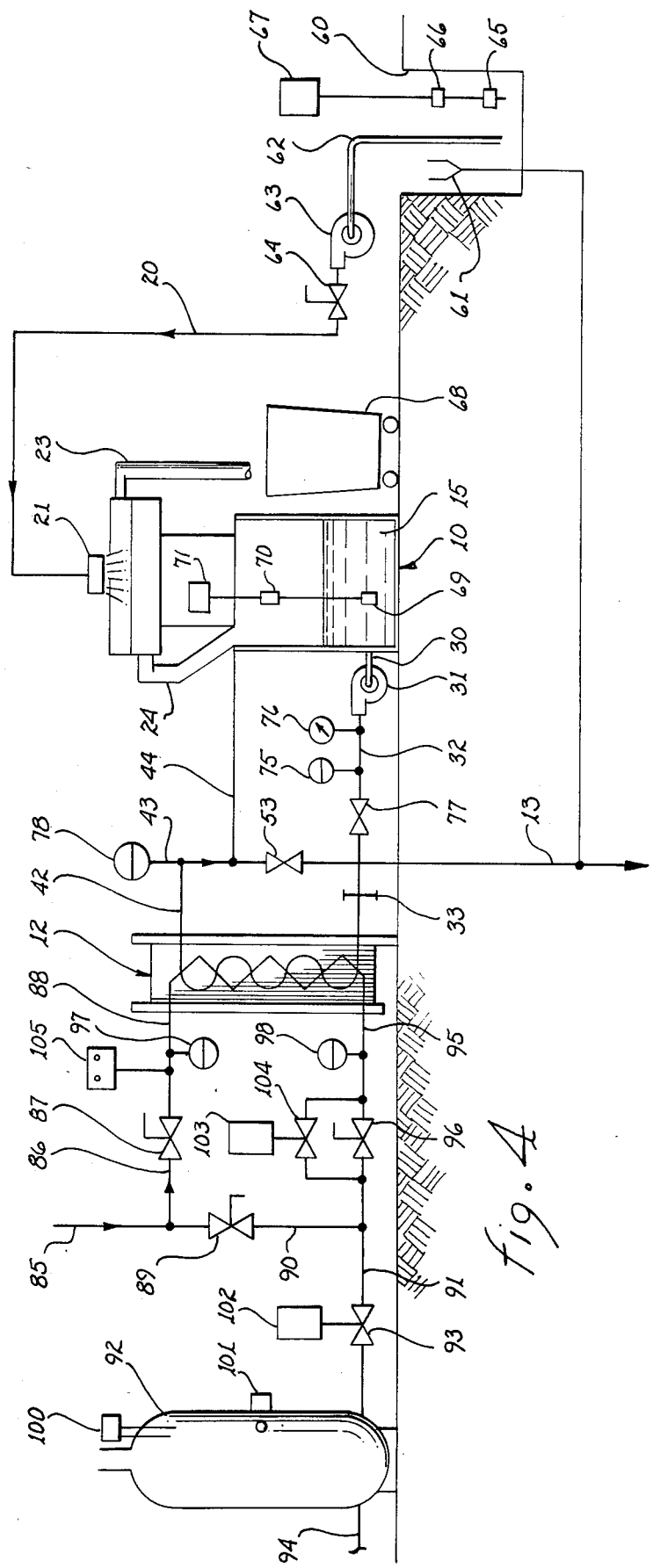
FIG. 4 is a schematic diagram illustrating a heat recovery system useable in a commercial laundry.

FIG. 4 is a schematic of an installation in a commercial laundry incorporating the present invention. A sump pit 60 receives waste water from the washing machines. The sump pit may include an overflow pipe 61 for conveying any overflow directly into discharge pipe 13 connected to a sewer. The waste water is drawn from the sump pit through pipe 62 by sump pump 63 and conveyed to conduit 20 through a throttling valve 64. The sump pit may include low and high level sensors 65 and 66, which sensors provide input signals to level control switch 67. The switch regulates the operation of sump pump 63.

The waste water distributed into waste water feed unit 10 by distributor 21 results in initial filtering of the waste water to discharge the solid elements through conduit 23 into a cart 68. The filtered water flows from a chamber beneath filter 22 through conduit 24 into feed tank 15. Sensors 69 and 70 are disposed within the feed tank and energize a switch 71. Switch 71 regulates the operation of sump pump 63 and pump 31. Thereby, the level within the feed tank can be maintained within predetermined limits.

Temperature and pressure gauges 75 and 76 sense the temperature and pressure of the waste water within conduit 32. Knowledge of the temperature of the waste water flowing into the heat exchanger will provide a determination of whether an economically effective heat transfer is feasible. Knowledge of the pressure, or variation thereof, will provide an indication of any increase in back pressure within the heat exchanger due to clogging or contamination.

A throttling valve 77 may be inserted within conduit 32 to maintain the most beneficial pressure and flow rate of the waste water entering the heat exchanger. Downstream of the throttling valve, air injection nozzle unit 33 introduces air to the waste water flowing into the heat exchanger. At outlet 42 from the heat exchanger, a temperature gauge 78 is mounted to determine the efficiency of heat extraction from the waste water. A normally open valve 53 is disposed downstream of a pipe 44 interconnecting pipe 43 and feed tank 15.

The fresh water to be heated is introduced through conduit 85. The water flows into the heat exchanger unit through conduit 86, normally open valve 87 and inlet 88. A switch 105 senses the flow through inlet 88 and may regulate the operation of feed pump 31. Bypass of the heat exchanger unit is effected by a valve 89 disposed within conduit 90, which conduit is in communication with a hot water storage tank 92 via a valve 93. Pipe 94 conveys hot water from tank 92 to the various washing machines within the laundry. Outlet 95 of the heat exchanger unit conveys the heated water through a throttling valve 96 to conduit 91.

Temperature gauges 97 and 98 provide indications of the temperature of the water flowing into and out of the heat exchanger unit. Additionally, sensors 100 and 101 may be incorporated within tank 92 to sense high and low water levels. These sensors may activate switches 102 and 103 respectively, to control operation of valves 93 and 104, respectively.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. An on line recovery system for use in a commercial laundry and the like comprising:
   a. a sump for receiving a laundry's heated waste water;
   b. separating means connected to said sump for receiving said waste water and separating particulate therefrom;
   c. a flat plate heat exchanger having interstices between adjacent plates of sufficiently small size as to be subject to clogging by contaminates passing said separating means connected to receive pressurized heated waste water from said separating means for cooling said waste water and connected to a source of fresh water to be heated for use in said laundry;
   d. an injection means for injecting air into said heated waste water, said injection means positioned to inject air into said heated waste water before said waste water enters said heat exchanger to create bubbles of air permeating said waste water as said waste water flows through said heat exchanger; and
   e. means connected to said heat exchanger for directing heated fresh water exiting therefrom to said laundry and means connected to said heat exchanger for disposing of cooled waste water exiting therefrom.

* * * * *